US008565841B2

(12) United States Patent
Usui et al.

(10) Patent No.: US 8,565,841 B2
(45) Date of Patent: Oct. 22, 2013

(54) CELL PHONE AND PROGRAM FOR CONTROLLING BROADCAST RECEIVING FUNCTION OF CELL PHONE

(75) Inventors: Noriyoshi Usui, Moriguchi (JP); Yasunori Yamada, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/476,916

(22) Filed: May 21, 2012

(65) Prior Publication Data
US 2012/0231842 A1    Sep. 13, 2012

Related U.S. Application Data

(63) Continuation of application No. 10/793,679, filed on Mar. 5, 2004, now abandoned.

(30) Foreign Application Priority Data

Mar. 5, 2003 (JP) .................................. 2003-57880

(51) Int. Cl.
*H04M 1/00* (2006.01)
*H04M 3/42* (2006.01)
*H04B 1/38* (2006.01)

(52) U.S. Cl.
USPC ....................................... 455/574; 455/414.1

(58) Field of Classification Search
USPC ............... 455/414.1, 572, 574, 571, 424, 425
See application file for complete search history.

(56) References Cited

U.S. PATENT DOCUMENTS

| 6,437,699 | B1 | 8/2002 | Hayakawa |
| 7,884,885 | B2* | 2/2011 | Su et al. ..................... 348/730 |
| 2001/0029196 | A1 | 10/2001 | Wakamatsu |
| 2002/0081997 | A1* | 6/2002 | Morishima ................. 455/412 |
| 2004/0192407 | A1 | 9/2004 | Formenti |

FOREIGN PATENT DOCUMENTS

| EP | 0 992 876 | 4/2000 |
| JP | 2000-307689 | 11/2000 |
| JP | 2002-185943 | 6/2002 |
| JP | 2002-223291 | 8/2002 |
| JP | 2002-320344 | 10/2002 |
| KR | 2001-0059645 | 7/2001 |

OTHER PUBLICATIONS

Japanese Office Action, with English Translation, issued in Japanese Patent Application No. 2003-057880, dated on Apr. 11, 2006.
Office Action from European Patent Office for Application No. 04 005 137.7-2414 dated Nov. 4, 2004.
Office Action from Korean Patent Application No. 10-2004-0013378, mailed on Oct. 20, 2010.

* cited by examiner

*Primary Examiner* — Andrew Wendell
(74) *Attorney, Agent, or Firm* — Duane Morris LLP

(57) ABSTRACT

The cell phone has a plurality of batteries for supplying power according to their use. When the power of a battery is nearly depleted while the user is viewing a TV program, the cell phone informs the user of that fact to restrict the viewing of the TV program.

7 Claims, 4 Drawing Sheets

FIG.3
| ENTRY | ENTRY INFORMATION |
|---|---|
| USE OF BATTERY A | EITHER FOR TELEPHONE COMMUNICATION OR TV USE |
| USE OF BATTERY B | EITHER FOR TELEPHONE COMMUNICATION OR TV USE |
| TV VIEWING RESTRICTING FUNCTION | ON |
| TV VIEWING RESTRICTING MODE | TV VIEWING PROHIBITED |
| USEFUL BATTERY POWER THRESHOLD LEVEL | USEFUL POWER LEVEL OF 50% |
FIG.4
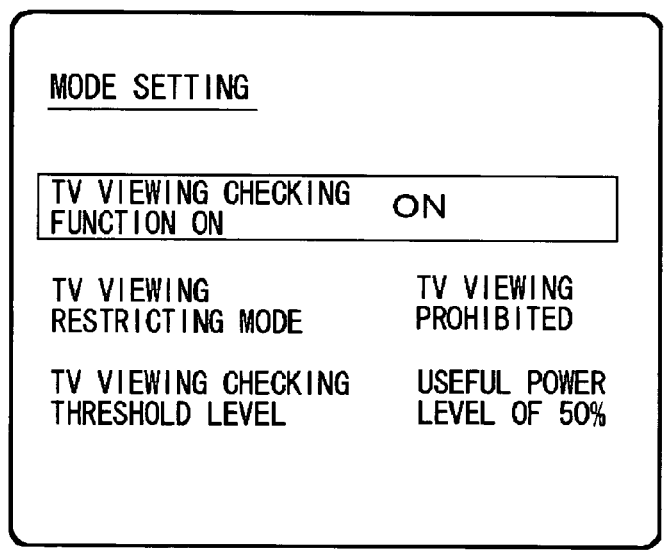
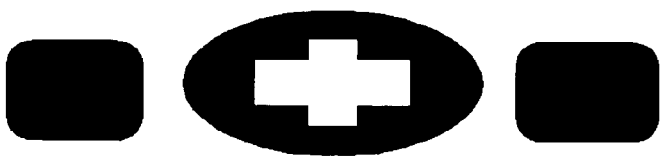

ation Ser. No. 10/793,679 filed Mar. 5, 2004 which claims priority to Japanese Patent Application No. 2003-57880 filed Mar. 5, 2003. The disclosures of these applications are incorporated herein by reference in their entirety.

CELL PHONE AND PROGRAM FOR CONTROLLING BROADCAST RECEIVING FUNCTION OF CELL PHONE

CROSS-REFERENCE TO RELATED APPLICATIONS

This application is a continuation of U.S. patent application Ser. No. 10/793,679 filed Mar. 5, 2004 which claims priority to Japanese Patent Application No. 2003-57880 filed Mar. 5, 2003. The disclosures of these applications are incorporated herein by reference in their entirety.

BACKGROUND OF THE INVENTION

1. Field of the Invention

The present invention relates to cell phones (including Personal Handy-phone System terminals or personal digital assistants) which have the function of receiving a broadcast such as a television broadcast, and more particularly to functional control provided to the cell phone by detecting the useful power level of a battery incorporated therein.

2. Description of the Related Art

Recent years have seen significant widespread use of cell phones.

Cell phones, used only for making a call in the past, are now provided with additional functions to serve as an information terminal device, e.g., for transmitting and receiving E-mail or image information and for retrieving information over the Internet. They are expected to be further provided with an additional function as a television broadcast receiver in the future.

On the other hand, since the cell phone is battery powered, efforts have been made for battery power savings purposes so that the cell phone can be operated on a limited-capacity battery as long as possible (see the Related Art List (1)).

RELATED ART LIST (1) Japanese Patent Application Laid-Open No. 2002-223291.

However, although the power consumption has been reduced as mentioned above, the additional functions provided to the cell phone may cause the user to spend more time on it, e.g., viewing TV programs in addition to making telephone calls. While viewing a TV program, the user can be so absorbed as not to notice the battery power being dissipated to such an extent that the user cannot make a call thereafter as desired due to the lack of battery power.

SUMMARY OF THE INVENTION

The present invention was developed in view of the aforementioned problem. It is therefore an object of the invention to provide a cell phone and a program for controlling a battery thereof which ensure the battery to provide power at least for a necessary call by preventing the user from spending too much time viewing a broadcast such as TV programs to notice the battery power being dissipated to such an extent that the user cannot make a call thereafter as desired due to excessive battery power consumption.

To achieve the aforementioned object, a cell phone according to a first aspect of the present invention includes an radio communication transceiver/receiver unit which transmits and receives speech or data by radio, a broadcast receiver which receives broadcast waves such as of a TV broadcast, a power supply unit which supplies power to each of the radio communication transceiver/receiver unit and the broadcast receiver, a plurality of batteries provided in the power supply unit, a use management unit which manages the use of the plurality of batteries, a power supply management unit which manages supply of power to the radio communication transceiver/receiver unit or the broadcast receiver according to the use managed by the use management unit, a power supply monitoring unit which monitors the useful power level of the batteries, an alarming unit which alarms the user that the power of a battery is nearly depleted while a broadcast is being received, the battery supplying power to the broadcast receiver, and a power supply restricting unit which restricts the supply of power to the broadcast receiver after the alarm has been provided.

To achieve the aforementioned object, a cell phone according to a second aspect of the present invention, based on the aforementioned first aspect, includes a non-interrupt instructing unit which instructs to continue receiving a broadcast, in which the power supply restricting unit continues supplying power to the broadcast receiver when the non-interrupt instructing unit instructs to continue receiving a broadcast when the useful power of the battery has been nearly depleted.

To achieve the aforementioned object, a program for controlling a broadcast receiving function of a cell phone, the cell phone having an radio communication transceiver/receiver unit which transmits and receives speech or data by radio and a broadcast receiver which receives broadcast waves such as of a TV broadcast, allows the cell phone to function as follows. That is, the program allows the cell phone to serve as power supply means which supplies power to each of the radio communication transceiver/receiver unit and the broadcast receiver, use management means which manages the use of a plurality of batteries provided in the power supply means, power supply management means which manages supply of power to the radio communication transceiver/receiver unit or the broadcast receiver according to the use managed by the use management means, power supply monitoring means which monitors the useful power level of the batteries, alarming means which alarms the user that the useful power of a battery is nearly depleted while a broadcast is being received, the battery being supplying power to the broadcast receiver, and power supply restricting means which restricts the supply of power to the broadcast receiver after the alarm has been provided.

To achieve the aforementioned object, a program for controlling a broadcast receiving function of a cell phone according to a fourth aspect of the present invention includes non-interrupt instructing means which instructs to continue receiving a broadcast according to the third aspect of the invention, allowing power to be supplied to the broadcast receiver means when the non-interrupt instructing means instructs to continue receiving a broadcast when the useful power of the battery has been nearly depleted.

Moreover, this summary of the invention does not necessarily describe all necessary features so that the invention may also be sub-combination of these described features.

BRIEF DESCRIPTION OF THE DRAWINGS

FIG. 3 is a schematic view illustrating a table containing the entries and entry information to be stored in a TV viewing entry information storage unit according to the embodiment of the present invention;

FIG. 4 is a view illustrating an entry window for imposing a restriction on TV viewing according to the embodiment of the present invention.

DETAILED DESCRIPTION OF THE INVENTION

Now, the present invention will be described below in more detail with reference to the accompanying drawings in accordance with the embodiment.

Figure 1:
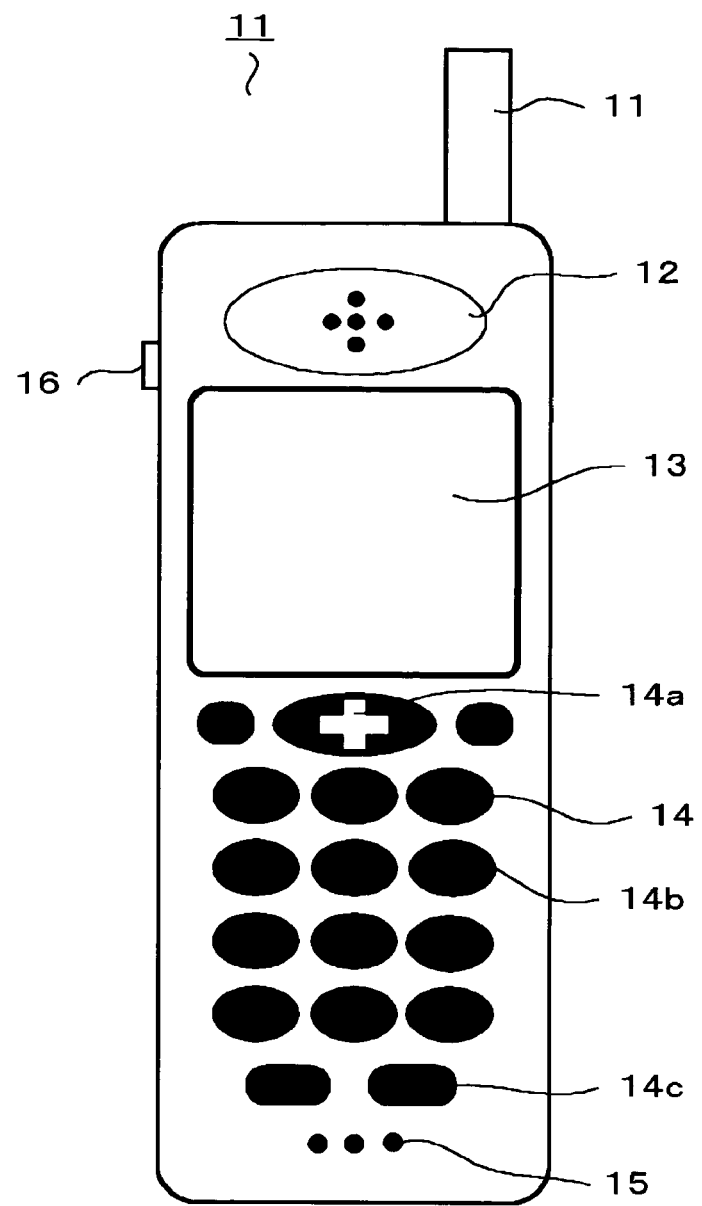
FIG. 1 is a view illustrating the outer appearance of a cell phone 10 according to an embodiment of the present invention.

FIG. 1 is a view illustrating the outer appearance of a cell phone 10 according to the embodiment of the present invention. The cell phone 10 includes an antenna 11, a speaker 12 for receiving a call, a display 13 such as an LCD, a set of various entry keys 14, a cursor control key 14a, numeral and character entry keys 14b, a TV viewing non-interrupt switch 14c which instructs a TV broadcast to be continually viewed in a case of an alarm being provided for restricting (prohibiting) TV viewing while the TV broadcast is being viewed, a microphone 15 which sends a call, and a microphone/earphone jack 16.

Figure 2:
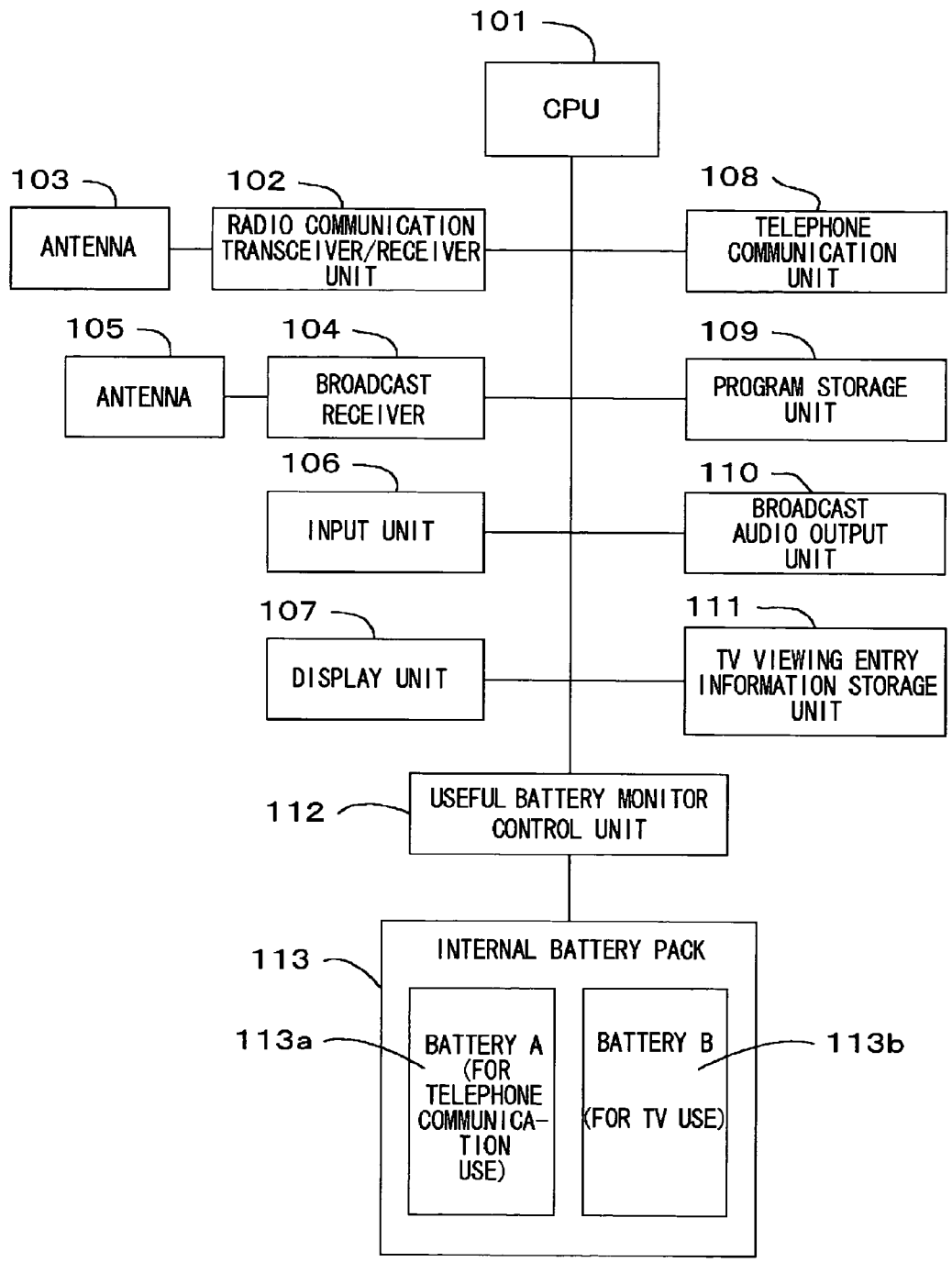
FIG. 2 is a block diagram illustrating the functional structure of the cell phone 10 according to the embodiment of the present invention.

FIG. 2 is a block diagram illustrating the functional structure of the cell phone 10. The cell phone 10 includes an radio communication transceiver/receiver unit 102 which transmits and receives speech and data by radio for telephone communications, a transceiver/receiver antenna 103 for the telephone communications, a broadcast receiver 104 which receives broadcast waves such as of a TV or radio broadcast to output a desired program for display, a broadcast receiver antenna 105, an input unit 106 which recognizes signals provided by pressing the set of various entry keys 14 for input, a display unit 107 which displays video information on the LCD 13, a telephone communication unit 108 made up of the speaker 12 which receives a call and the microphone 15 which transmits a call, a program storage unit 109 which stores various control programs such as a control program which provides prohibition control to the function of viewing a broadcast such as a TV broadcast in accordance with information on a useful battery power level, a broadcast audio output unit 110 which outputs audio information of a broadcast program via the speaker 12 or the earphone jack 15, a TV viewing entry information storage unit 111 which sets and stores the operating conditions of the TV broadcast viewing function in accordance with a useful battery power level, a useful battery monitor control unit 112 which monitors the respective voltages of an internal battery A 113a and battery B 113b and provides control to the battery used for supplying power to the cell phone 10 depending on the use thereof, and an internal battery pack 113 made up of rechargeable batteries, i.e., the battery A 113a used mainly for a telephone call function and the battery B 113b used mainly for a TV function.

FIG. 3 is a schematic view illustrating a table containing the entries and entry information stored in the TV viewing entry information storage unit. The entries include the use of the battery A 113a and the battery B 113b (for a telephone communication use only, for a TV use only, or for either the telephone communication or TV use), the operating condition for the function of restricting the TV broadcast viewing in accordance with a useful battery power level upon viewing a TV broadcast (entry information: ON or OFF), the operating condition of a TV broadcast viewing restricting mode for setting the operating condition of the TV broadcast viewing restricting function when the useful battery power level has reached a predetermined voltage value (entry information: TV viewing prohibited (with an alarm) or TV viewing continued (only with a warning), and a useful battery power threshold level for setting the condition for the useful battery power level at which the TV broadcast viewing restricting function operates (entry information: useful battery power level (a useful power level of 90%, 70%, 50%, 30%, or 10%)).

The aforementioned TV viewing entry information can be set by the user on a mode entry window of the cell phone 10 as appropriate. FIG. 4 is a view illustrating an entry window for setting the conditions of restricting the TV broadcast viewing.

Figure 5:
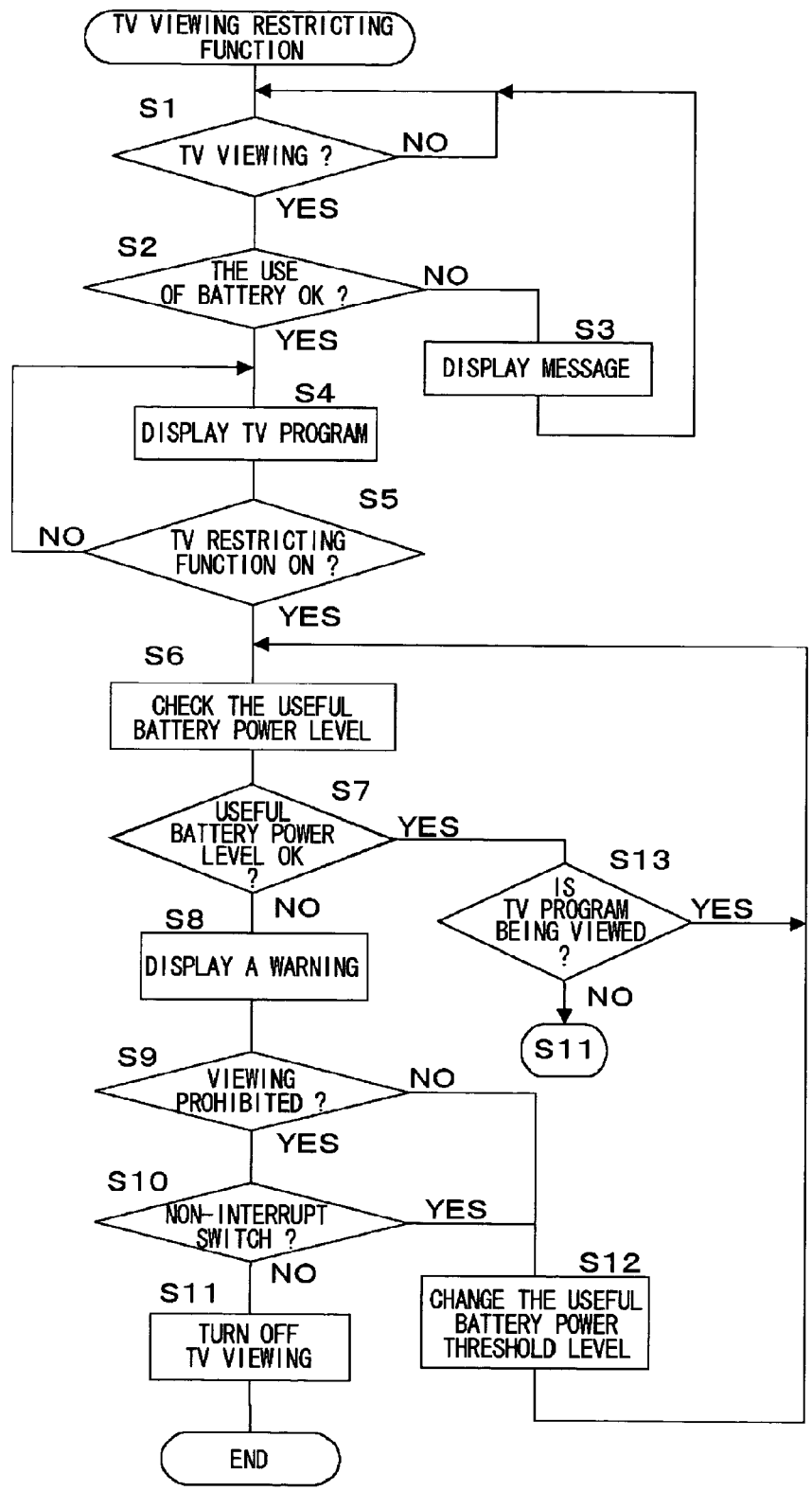
FIG. 5 is a flowchart illustrating the operation of a TV viewing restricting function according to the embodiment of the present invention.

Now, the operation of the TV viewing restricting function performed while a TV broadcast is being viewed is explained below with reference to the flowchart illustrated in FIG. 5.

When the TV viewing switch is selected in step 1 or S1 (the term "step" is denoted as "S" hereinafter as well as in the figure), the process checks the information on the use of the internal batteries 113a, 113b (S2). If both the batteries are set only for the telephone communication use, the process displays that the use of the batteries has to be changed. If the information on the battery use shows that the batteries are set only or also for the TV use, the battery set for the TV use supplies power, thereby allowing a TV program image to appear on the display 13 (S4).

If the TV viewing restricting function is set at ON (S5), the process monitors the useful power level of the battery assigned to the TV use (S6). The useful power level of the battery 113 for the TV use is checked; if both the batteries A 113a and B 113b are set for the TV use, the total useful power level of both the batteries is checked. If a sufficient useful battery power level is available (S7), the process allows the user to continue viewing the TV program (S13) that the user has been viewing, and continues monitoring the useful battery power level. If the useful battery power level has reached the preset level (S7), the process indicates a warning (S8).

If the TV viewing restricting mode is set at the TV viewing prohibited (S9), the process determines whether the TV viewing non-interrupt switch 14c has been depressed during the indication of the warning (S10). If the non-interrupt switch 14c has not been depressed, the process turns OFF the TV viewing function (S11).

On the other hand, if the non-interrupt switch 14c has been depressed (S10), the process allows the warning to disappear and the useful battery power threshold level to be set to the next lower level (S12) (e.g., to be changed from the useful power level of 50% to 40%), thereafter monitoring continually the useful battery power level (S7).

Even when the TV viewing restricting mode provides only a warning, the useful battery power threshold level is set to the next lower level to continue monitoring the useful battery power level (S6).

It should be understood that the aforementioned embodiment has been disclosed herein not for restrictive purposes but only by way of example in all respects. It is also intended that the present invention is not defined by the embodiment described above but by the scope of the appended claims, and includes all the equivalents and modifications that fall within the scope of the claims.

What is claimed is:

1. A cell phone comprising:
   a radio communication transceiver/receiver unit which transmits and receives speech or data by radio;

a broadcast receiver which receives broadcast waves such as of a TV broadcast;

a power supply unit which supplies power to each of the radio communication transceiver/receiver unit and the broadcast receiver;

a power supply management unit which manages supply of power to the radio communication transceiver/receiver unit or the broadcast receiver;

a power supply monitoring unit which monitors the is operable to monitor a useful power level of a battery; and a TV viewing information storage unit that stores an ON or OFF operating condition of a function of restricting the viewing of the TV broadcast, wherein, when the function of restricting is set ON, the power supply management unit directs the power supply monitoring unit to check the useful battery power level, and, when the function of restricting is set OFF, the power supply monitoring unit is not directed to check the useful battery power level, and further, when the function of restricting is set ON;

an alarming unit which alarms the user that the useful power of the battery is less than a useful battery power level threshold value while a broadcast is being received, the battery supplying power to the broadcast receiver; and a power supply restricting unit which restricts the supply of power to the broadcast receiver after the alarm has been provided, wherein the power supply restricting unit turns off a television function of the cell phone if a non-interrupt switch of the cell phone is not depressed.

2. The cell phone according to claim 1, further comprising a TV viewing entry information storage unit which stores useful battery power level threshold values, wherein, when the power supply restricting unit receives an instruction to continually receive broadcast waves, the power supply restricting unit directs the alarming unit to lower the useful battery power threshold level by one step from the current level and suspends restriction of the supply of power to the broadcast receiver.

3. The cell phone according to claim 1, further comprising a non-interrupt instructing unit that instructs to continue receiving a broadcast, wherein, in the event that an instruction to continue is provided from the non-interrupt instructing unit when the useful battery power level is low, the power supply restricting unit continues to display a TV program.

4. The cell phone according to claim 1, wherein the TV viewing information storage unit that stores a TV viewing prohibited mode setting or a TV viewing continued mode setting of a TV viewing mode, and when the television viewing restricting function is set ON and the TV viewing mode is set TV viewing prohibited, the power supply restricting unit turns off the television function of the cell phone if a non-interrupt switch of the cell phone is not depressed.

5. The cell phone according to claim 1, wherein the TV viewing information storage unit that stores a TV viewing prohibited mode setting or a TV viewing continued mode setting of a TV viewing mode, and when the television viewing restricting function is set ON and the TV viewing mode is set TV viewing continued, the power supply restricting unit lowers the useful battery power threshold level and continues the television function.

6. A method of controlling a broadcast receiving function of a cell phone, the method comprising:

receiving television broadcast using a broadcast receiver;
supplying power to the broadcast receiver;
managing supplying of power to the broadcast receiver;
monitoring a power level of a battery; and,
storing an ON or OFF operating condition of a function of restricting the viewing of the TV broadcast and, when the function of restricting is set ON, checking useful battery power level, and, when the function of restricting is set OFF, not check the useful battery power level, and further, when the television viewing restricting function is set ON;

generating an alarm that notifies a user that the power level of the battery is nearly depleted while a broadcast is being received, the battery supplying power to the broadcast receiver;

restricting the supply of power to the broadcast receiver after the alarm has been provided; and turning off a television of the cell phone if a non-interrupt switch if the cell-phone is not depressed.

7. A non-transitory computer-readable medium storing program code that when executed performs a method of controlling a broadcast receiving function of a cell phone, the method comprising:

receiving television broadcast using a broadcast receiver;
supplying power to the broadcast receiver;
managing supplying of power to the broadcast receiver;
monitoring a power level of a battery; and,
storing an ON or OFF operating condition of a function of restricting the viewing of the TV broadcast and, when the function of restricting is set ON, checking useful battery power level, and, when the function of restricting is set OFF, not check the useful battery power level, and further, when the television viewing restricting function is set ON;

generating an alarm that notifies a user that the power level of the battery is nearly depleted while a broadcast is being received, the battery supplying power to the broadcast receiver;

restricting the supply of power to the broadcast receiver after the alarm has been provided; and turning off a television of the cell phone if a non-interrupt switch if the cell-phone is not depressed.

* * * * *